United States Patent
Neubauer et al.

(10) Patent No.: US 6,278,070 B1
(45) Date of Patent: *Aug. 21, 2001

(54) STEERING COLUMN SWITCH WITH MICROSWITCHES THAT HAS TWO OPERATING POSITIONS AND ONE NEUTRAL POSITION SYSTEM FOR CLEANING WINDSCREENS

(75) Inventors: Walter Neubauer, Lauffen; Josef-Elmar Prang, Bietigheim-Bissingen; Rudolf Klein, Lauffen, all of (DE)

(73) Assignee: ITT Manufacturing Enterprises, Inc., Wilmington, DE (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/809,269
(22) PCT Filed: Sep. 8, 1995
(86) PCT No.: PCT/EP95/03535
   § 371 Date: Jul. 28, 1997
   § 102(e) Date: Jul. 28, 1997
(87) PCT Pub. No.: WO96/08390
   PCT Pub. Date: Mar. 21, 1996

(30) Foreign Application Priority Data

Sep. 12, 1994 (DE) .................................. 44 32 343

(51) Int. Cl.⁷ .................................. H01H 21/82
(52) U.S. Cl. .................. 200/61.27; 200/18; 200/332
(58) Field of Search ............... 200/61.27, 61.28, 200/61.54, 557, 558, 332, 295, 18, 6 A, 296, 294, 292

(56) References Cited

U.S. PATENT DOCUMENTS 2,796,499 * 6/1957 Barden et al. ...................... 200/292

FOREIGN PATENT DOCUMENTS

| 2444808 | 4/1976 | (DE) . |
| 3211672 | 10/1983 | (DE) . |
| 3623979 | 1/1988 | (DE) . |
| 2551704 | * 3/1985 | (FR) . |
| 2084805 | 4/1982 | (GB) . |
| WO 9608390 | 3/1996 | (WO) . |

OTHER PUBLICATIONS

English Translation of the International Preliminary Examination Report of International Appl. No. PCT/EP95/03535.

* cited by examiner

Primary Examiner—Renee Luebke
(74) Attorney, Agent, or Firm—J. Gordon Lewis

(57) ABSTRACT

A steering column switch for motor vehicles comprises a base plate and first, second, and third identical microswitches placed onto the plate that are indirectly actuated by an operating lever through terminal links. The operating lever has a neutral position and two operating positions. The third microswitch that is assigned to the neutral position is arranged in a flat position. The terminal link actuating the third microswitch is arranged in a plane parallel to the base plate. A sampling roller prevents frictional losses during the actuation of the third microswitch via a control contour on the control lever.

8 Claims, 2 Drawing Sheets

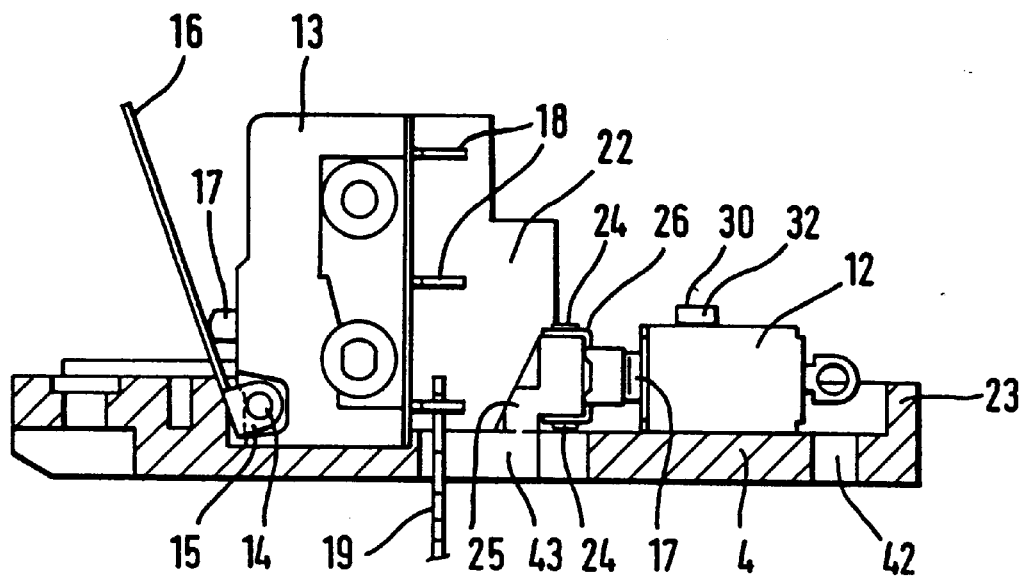
Fig. 3
Fig. 4
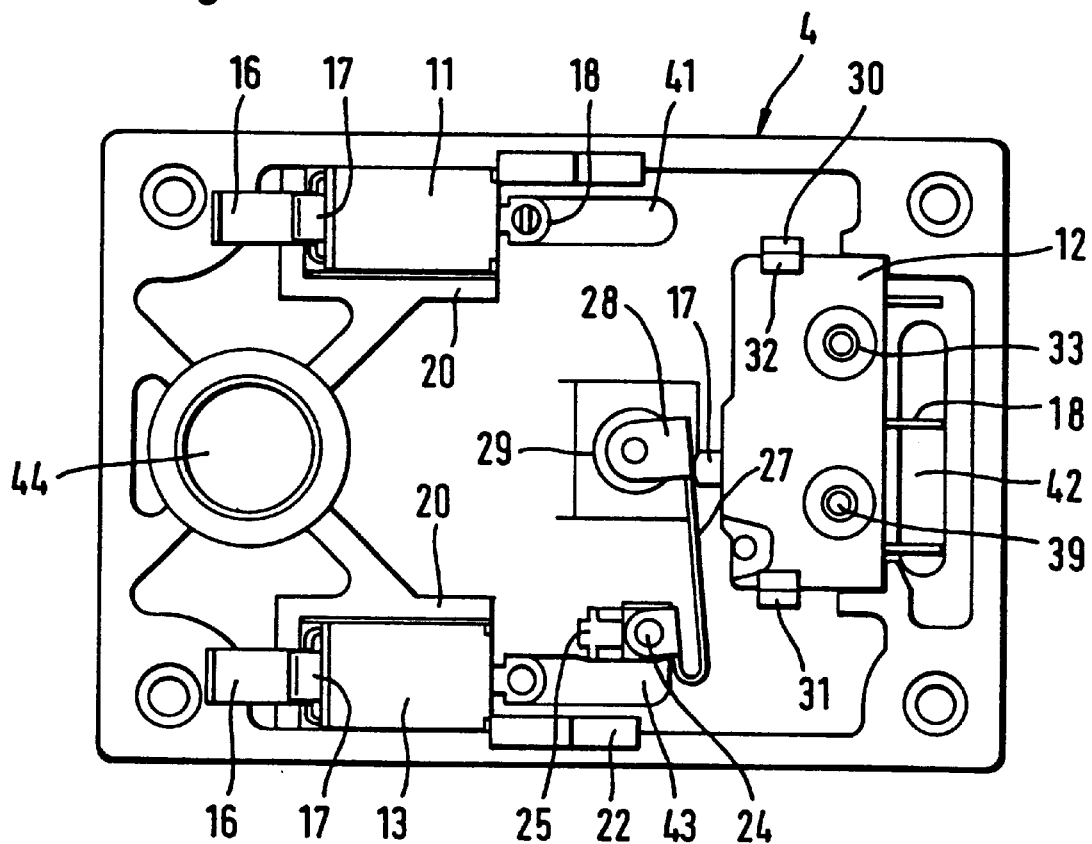

STEERING COLUMN SWITCH WITH MICROSWITCHES THAT HAS TWO OPERATING POSITIONS AND ONE NEUTRAL POSITION SYSTEM FOR CLEANING WINDSCREENS

BACKGROUND OF THE INVENTION

The invention pertains to a switch for motor vehicles which comprises a pivoted operating lever, one pivoting position of which represents a neutral position that also has an assigned electrical state.

DE-OS 3,249,359 discloses a steering column switch, in which the left or right turn signals are respectively connected to a voltage source via sensitive microswitches if the operating lever is manually moved into the two operating positions. In this particular switch, no circuit is closed in the neutral position of the operating lever.

In this known steering column switch, the sensitive microswitches are realized in the form of encapsulated circuit switches that are actuated by the operating lever.

A similar switch with two sensitive microswitches that are realized in the form of make contact elements and selectively actuated via the operating lever is used as a mode selection switch in construction machines and tractors. In one operating position of the operating lever, the transmission is shifted into the forward mode, with the transmission being shifted into the reverse mode when the operating lever is moved into the other operating position. In such instances, it would be desirable to close an additional circuit in the neutral position of the operating lever which, for example, is looped into the starter circuit of an internal combustion engine.

The additional circuit that is closed in the neutral position of the operating lever should be interrupted in both operating positions of the operating lever so as to effectively prevent the internal combustion from starting in one of the operating positions that represent the forward mode and the reverse mode of the transmission.

DE-OS 3,623,979 discloses a suitable switch for this purpose that fulfills its function with only two sensitive microswitches. However, the switches disclosed in this publication are relatively complicated and have a comparatively large space requirement. In addition, the switching contacts are not well protected, i.e., the switching contacts are easily affected by dirt and corrosion.

A similar switch is described in DE-OS 2,855,451.

An object of the invention consists of designing a switch with three switching positions in such a way that it can be inexpensively manufactured and that it is largely insensitive to environmental influences.

SUMMARY OF THE INVENTION

This objective is attained with-a third encapsulated microswitch that is assigned to the neutral position and delivers the desired signal.

The operating lever must have a sufficient size in order to ensure its simple handling, but the travel range of the microswitches available on the market is very small. According to the invention, the operating lever is made into a T-shape and can be selectively rotationally moved around a pivoting axis passing through the lever in an area of intersection of horizontal and vertical portions of the T-shape. In order to realize a precise switching function of the microswitches, the operating lever does not directly act upon the actuating pin of the corresponding microswitch, but rather indirectly via a terminal link that carries out the suitable power and directional transmission. The operating lever engages on the terminal links of the first and second microswitches by the ends of its horizontal portion and acts on the terminal link of the third microswitch by the free end of its vertical portion, respectively.

Such a terminal link may be arranged on the end of a microswitch such that it can be independently turned. However, this predetermines a power and directional transmission that is considered unsuitable for the actuation of a microswitch in the neutral position because only a relatively small angular movement is frequently available for the actuation of the switch. In order to ensure a precise switching function in this respect, a pivotal axis for the third terminal link is arranged normal to the plane of the base plate and a pivoted end of the third terminal link acts upon an actuating pin of the third microswitch. These features make it possible to realize a relatively low spring constant with respect to the contact between the terminal link and the operating lever, and to actuate the actuating pin of the microswitch with a comparatively short travel of the terminal link.

In order to increase the travel of the operating lever that only passes the actuating pin over a relatively short distance in the actuating direction of the actuating pin, the operating lever is provided with a control projection that engages on the third terminal link and actuates this terminal link during a pivoting motion of the operating lever. These features make it possible to hold the microswitch in the desired actuating state in the small, limited switching positions of the operating lever. This may, in principle, be realized by providing a control contour on the guide projection which acts upon the terminal link and controls the actuating pin via the terminal link.

In order to reduce the friction caused thereby and the resulting wear, a sampling roller is arranged in rotatable fashion on the third terminal link in such a way that the sampling roller samples a control contour arranged on the operating lever control projection during the pivoting motion of the operating lever. Due to these features forces exerted in the longitudinal direction of the terminal link are reduced to a minimum, i.e., the operating lever can be operated very easily.

The microswitches are held between projections that protrude normally from the base plate.

In order to additionally prevent the third microswitch from moving opposite to the installation direction, the microswitch is held on the base plate by a projection latch connection where a latching tab is provided that engages behind a lateral edge of the microswitch.

An additional holding projection engages the third microswitch into a through opening therein.

This additional holding projection may be hot-deformed on the end thereof that protrudes beyond the through opening in such a way that it engages behind an edge of the through opening.

There are provided windows in the base plate, and electrical connections of the microswitches lie above the windows, with connecting lines that lead to the electrical connections extending through the windows from underneath the base plate.

One embodiment of the invention is described below with reference to the figures.

BRIEF DESCRIPTION OF THE DRAWINGS

The figures show:

FIG. 3 a side view of the switch according to the invention which is realized without an operating lever, and FIG. 4 a top view of the switch according to FIG. 3.

DETAILED DESCRIPTION OF THE DRAWINGS

Figure 1:
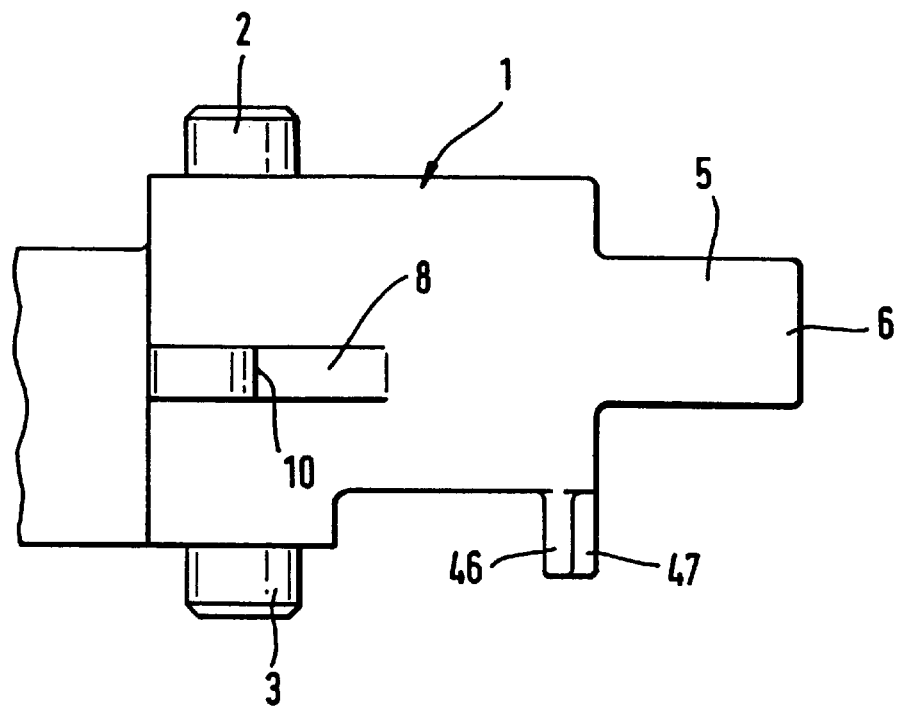
FIG. 1 a side view of a sectioned operating lever.
Figure 2:
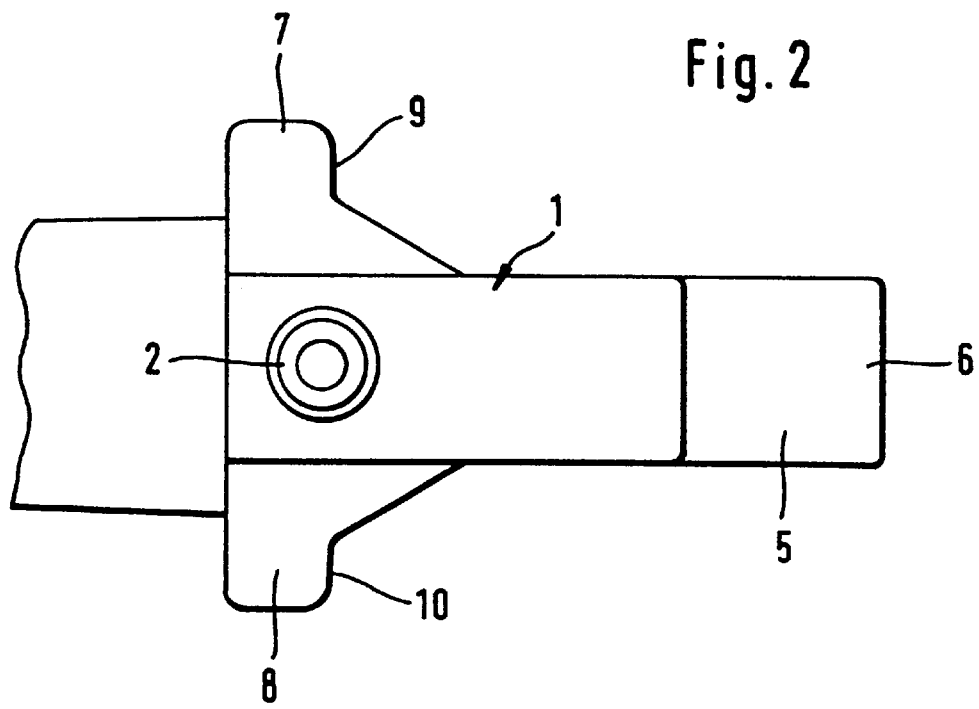
FIG. 2 a top view of the operating lever according to FIG. 1.

The operating lever 1 is arranged on the base plate 4 (FIG. 3, 4) with the aid of two pivot pins 2,3 such that said operating lever can be turned relative to the base plate. In FIGS. 1 and 2, the operating lever comprises an extension, which is not shown, on the left side of the line of section. The operating lever 1, which is made into a T-shape, can be pivoted about a pivoting axis (not shown) passing through the pivot pins 2, 3 in an area of intersection of horizontal and vertical portions of the T-shape by means of this extension. In addition, the operating lever 1 is provided with a sleeve 5 that serves for accommodating a latch element. In this case, the latch element is conventionally supported on a contour that is arranged stationary with respect to the base plate 4. Consequently, the latch element can be latched into three angular positions that correspond to the two operating positions and the neutral position of the operating lever. In the top view according to FIG. 2, the operating lever 1 is shown in its neutral position. The operating lever is moved into its two operating positions by pivoting its front end 6 about the pivot pins 2 and 3 in FIG. 2.

The operating lever 1 carries two lateral wings 7, 8, of its horizontal portion that comprise two actuating surfaces 9,10. These actuating surfaces follow the pivoting motion of the operating lever. The base plate 4 in FIGS. 3 and 4 is equipped with three microswitches 11, 12, 13 which are encapsulated and identically designed. In this case, the two cuboid microswitches 11 and 13 are arranged in upright fashion, with the microswitch 12 being arranged such that it lies on the base plate 4. The housings of the microswitches 11 and 13 are provided with two opposing projections, in which a bearing fork 15 of a terminal link 16 is arranged in pivoted fashion. The bearing fork 15 is supported in the pivoted fashion by bearing bolts 14. The two terminal links 16 act upon actuating pins 17 that extend into the housings of the microswitches 11–13 and initiate the desired switching processes when they are moved in their longitudinal direction.

The electrical connections 18 of the microswitches, which, for example, are connected to an electric line 19, are shown on the side of the microswitches 11–13 that is situated opposite to the actuating pin 17.

The microswitches 11 and 13 are held by side walls of the base plate. These microswitches are clamped into the bordered interior of the base plate by means of clamping connections. The side walls 20 are relatively low in comparison to the height of the microswitches. The holding mechanism of the microswitches also includes high side walls 22 that simultaneously ensure a mechanical shielding of the electrical connections 18 and support the microswitches 11, 13 in the plane of the base plate 4, namely in the direction that is not blocked by the side walls 20 and a circumferential edge 23. A bearing block 25 protrudes from the base plate 4. A bearing fork 26 is supported in pivoted fashion by two bearing bolts 24 that protrude from the aforementioned bearing block.

The bearing fork 26 forms the rotatably supported end of a second terminal link 27 that acts upon the bearing pin 17 of the microswitch 12. A second bearing fork 28 is arranged on the end of the terminal link 27 which is situated opposite to the bearing fork 26. A sampling roller 29 is supported in rotatable fashion in the second bearing fork. The flat-lying microswitch 12 is fastened onto the base plate 4 by means of latching arms 30,31 that engage on the surface of the microswitch 12 with their tabs 32 and retain the microswitch relative to the base plate. Holding projections 39 that protrude into the microswitch via through-openings 33 additionally serve for fastening the lying microswitch 12. After installing the microswitch 12, the upper end of the holding projections may be flattened such that said holding projections are able to prevent the microswitch from being lifted off the base plate.

Within the region of the connections 18, the base plate is provided with windows 41, 42, 23. As described previously, an electric line 19 (FIG. 3) that leads from a connection 18 to the on-board network of a motor vehicle or to a sink extends through these windows.

In the assembled condition, the operating lever 1 is arranged such that it can be pivoted relative to the base plate 4 about its pivot pins 2,3. In this case, the pivot pin 3 engages into a cylindrical pot 44 on the base plate 4. The bearing point for the pivot pin 2 which is situated in the housing of the switch is not visible in the figures.

The operating lever that is arranged on the base plate 4 in pivoted fashion engages on the terminal links 16 with the actuating surfaces 9,10 of the lateral wings 7, 8. In FIG. 3, these terminal links extend transversely from the lower right to the upper left.

In the installed condition of the operating lever 1, the free travel of the terminal link is limited to such a degree that a comparatively small travel range of the operating lever must suffice for actuating both microswitches 11, 13.

A control projection 46 that carries an essentially V-shaped control contour 47 is fastened to the lower end of the vertical portion the operating lever (see FIG. 1). When pivoting the operating lever, the control contour 47 passes a sampling roller 29 that is prestressed in the direction of the contour springs and arranged within the region of its neutral position such that said roller and consequently the corresponding end of the second bearing fork 28 are moved in accordance with the control contour 47 (comparatively V-shaped). This motion results in a slight pivoting motion about the bearing bolt 24.

The free end of the second bearing fork that is moved toward the right during the passage of the control contour 47 according to FIG. 4 consequently presses the actuating pin 17 of the microswitch 12 into the microswitch and actuates the switching contact of the microswitch in the desired fashion. In other words, when the operating lever 1 is in its neutral position, the contour 47 acts through the roller 29 and terminal link 27 onto the pin 17, thus activating the third microswitch 12 and moving it into an operating microswitch position. On the other hand, when the operating lever is being rotated and thus leaves its neutral position, the contour 47 exerts no pressure anymore on the pin 17, which results in releasing the microswitch 12 and deactivating it into an idle microswitch position.

What is claimed is:

1. A switch for motor vehicles, comprising:
   a base plate;
   a manually activated T-shape operating lever that can be selectively rotatably moved around a pivoting axis passing through said operating lever in an area of intersection of horizontal and vertical portions of said T-shape from a neutral lever position into either a first or a second operating lever position;

a first and a second encapsulated microswitch placed in an upright fashion onto said base plate, said first and a second encapsulated microswitch each having an idle microswitch position and an operating microswitch position;

said first and said second microswitches being adapted to be activated by said operating lever, when it moves from said neutral lever position into said first or said second operating lever position respectively, to thus move from said idle microswitch position into said operating microswitch position;

a third encapsulated microswitch placed in a lying position onto said base plate;

said third microswitch being adapted to be activated by said operating lever in said neutral lever position, wherein a terminal link is provided for operating each of said first and said second microswitches, said operating lover engaging on each terminal link with a corresponding end of said horizontal portion of said T-shape thereof during said rotating motion thereof, to thereby move the corresponding microswitch into its operating microswitch position, and wherein a third terminal link is provided for said third microswitch, and said operating lever is provided with a control projection at a free end of said vertical portion of said T-shape thereof, said control projection engaging on said third terminal link in said neutral lever position to thereby activate said third microswitch, whereas, when moving with said operating lever during said rotating motion thereof from said neutral lever position, said control projection disengages from said third terminal link and thus deactivates said third microswitch, whereby said third microswitch moves into said idle microswitch position.

2. The switch according to claim 1, wherein a pivoting axis of said third terminal link extends parallel to said pivoting axis of said operating lever.

3. The switch according to claim 1, wherein a sampling roller is arranged in rotatable fashion on said third terminal link in such a way that said sampling roller samples a control contour arranged on said control projection during said pivoting motion of said operating lever.

4. The switch according to claim 1, wherein a pivoting axis of a third terminal link is arranged normal to a plane of said base plate and a pivoted end of said third terminal link acts upon an actuating pin of said third microswitch.

5. The switch according to claim 1, wherein said third microswitch is held between projections that perpendicularly protrude from said base plate.

6. The switch according to claim 5, wherein at least one projection of said projections is provided with a latching tab that engages behind a lateral edge of said third microswitch and thus holds said third microswitch on said base plate.

7. The switch according to claim 1, wherein a holding projection engages into an opening of said third microswitch.

8. The switch according to claim 7, wherein said holding projection is hot-deformed on its end that protrudes beyond said opening in such a way that it engages behind an edge of said opening.

* * * * *